US012801860B2

(12) United States Patent
Kesarwani et al.

(10) Patent No.: US 12,801,860 B2
(45) Date of Patent: Nov. 17, 2026

(54) DATABASE SYSTEMS AND AUTOMATED CONVERSATIONAL INTERACTION METHODS USING BOUNDARY COALESCING CHUNKS

(71) Applicant: Salesforce, Inc., San Francisco, CA (US)

(72) Inventors: Saurabh Kesarwani, Bangalore (IN); Rajdeep Dua, Hyderabad (IN)

(73) Assignee: Salesforce, Inc.

(*) Notice: Subject to any disclaimer, the term of this patent is extended or adjusted under 35 U.S.C. 154(b) by 296 days.

(21) Appl. No.: 18/442,776

(22) Filed: Feb. 15, 2024

(65) Prior Publication Data

US 2025/0265420 A1 Aug. 21, 2025

(51) Int. Cl.

*G06F 40/35* (2020.01)
*G06F 16/3329* (2025.01)
*G06F 40/289* (2020.01)

(52) U.S. Cl.

CPC .......... *G06F 40/35* (2020.01); *G06F 16/3329* (2019.01); *G06F 40/289* (2020.01)

(58) Field of Classification Search

CPC ........ G06F 40/30; G06F 40/35; G06F 40/289; G06F 16/3329

See application file for complete search history.

(56) References Cited

U.S. PATENT DOCUMENTS 5,577,188 A 11/1996 Zhu
5,608,872 A 3/1997 Schwartz et al.
5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.

(Continued)

OTHER PUBLICATIONS

John Conway, Database Systems And Methods For Automated Conversational Responses, U.S. Appl. No. 18/505,988, filed Nov. 9, 2023.

*Primary Examiner* — Anne L Thomas-Homescu

(74) *Attorney, Agent, or Firm* — Ingrassia Fisher & Lorenz, LLP

(57) ABSTRACT

Database systems and methods are provided for managing usage of large language models (LLMs). One method involves dividing text data into primary chunks using input criteria associated with an LLM service, generating secondary chunks by merging respective pairs of adjacent primary chunks, and inputting a respective secondary chunk to the LLM service when a semantic similarity between a conversational input to a user interface and the respective secondary chunk of the one or more secondary chunks is greater than a threshold. The LLM service generates response data responsive to the conversational input based at least in part on a subset of the text data associated with the respective secondary chunk, and a response is provided to the conversational input at the user interface based at least in part on the response data generated by the LLM service.

20 Claims, 6 Drawing Sheets

(56) References Cited

U.S. PATENT DOCUMENTS

| | | | |
|---|---|---|---|
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 10,762,438 | B1 * | 9/2020 | Zhang ...................... G06N 3/08 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0249972 | A1 | 10/2008 | Dillon |
| 2009/0063414 | A1 | 3/2009 | White et al. |
| 2009/0100342 | A1 | 4/2009 | Jakobson |
| 2009/0177744 | A1 | 7/2009 | Marlow et al. |
| 2011/0247051 | A1 | 10/2011 | Bulumulla et al. |
| 2012/0042218 | A1 | 2/2012 | Cinarkaya et al. |
| 2012/0218958 | A1 | 8/2012 | Rangaiah |
| 2012/0233137 | A1 | 9/2012 | Jakobson et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2023/0086653 | A1 * | 3/2023 | Zykh .................. G06Q 30/0282 705/347 |
| 2024/0296278 | A1 * | 9/2024 | Grimshaw .............. G06F 40/40 |
| 2024/0419745 | A1 * | 12/2024 | Brooks ............... G06F 16/9535 |
| 2025/0173330 | A1 * | 5/2025 | Durg ..................... G06F 16/243 |

* cited by examiner

DATABASE SYSTEMS AND AUTOMATED CONVERSATIONAL INTERACTION METHODS USING BOUNDARY COALESCING CHUNKS

TECHNICAL FIELD

One or more implementations relate to the field of database systems, and more specifically, to automatically responding to conversational user input.

BACKGROUND

Modern software development has evolved towards web applications and cloud-based applications that provide access to data and services via the Internet or other networks. Businesses also increasingly interface with customers using different electronic communications channels, including online chats, text messaging, email or other forms of remote support. Artificial intelligence (AI) may also be used to provide information to users via online communications with "chatbots" or other automated interactive tools. Using chat-bots, automated AI systems conduct text-based chat conversations with users, through which users request and receive information. Chatbots generally provide information to users for predetermined situations and applications, and in practice, may be limited depending on the nature of the training data utilized to develop the chatbot.

Chatbots have been developed using large language models (LLMs) that have access to or knowledge of a larger data set and vocabulary, such that they are more likely to have applicable information for a wide range of potential input prompts. In practice, LLMs may lack context or other understanding of information or situations that are not represented within their training data, which can impair the ability of LLMs to provide accurate or contextually relevant responses. To counteract this, grounding may be performed to provide supplemental contextual information to the LLM to help the LLM generate more accurate and contextually relevant output responses to a particular input prompt that might otherwise be outside the scope of the training data. However, depending on the configuration, the size or amount of information that can be provided in connection with an individual query or input to an LLM may be limited, which can limit the ability to ground the LLM in a single call. Additionally, making multiple calls to the LLM can be cost prohibitive and increase processing, time and/or storage requirements. Accordingly, it is desirable to provide systems and methods capable of effectively grounding of LLMs while mitigating costs.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
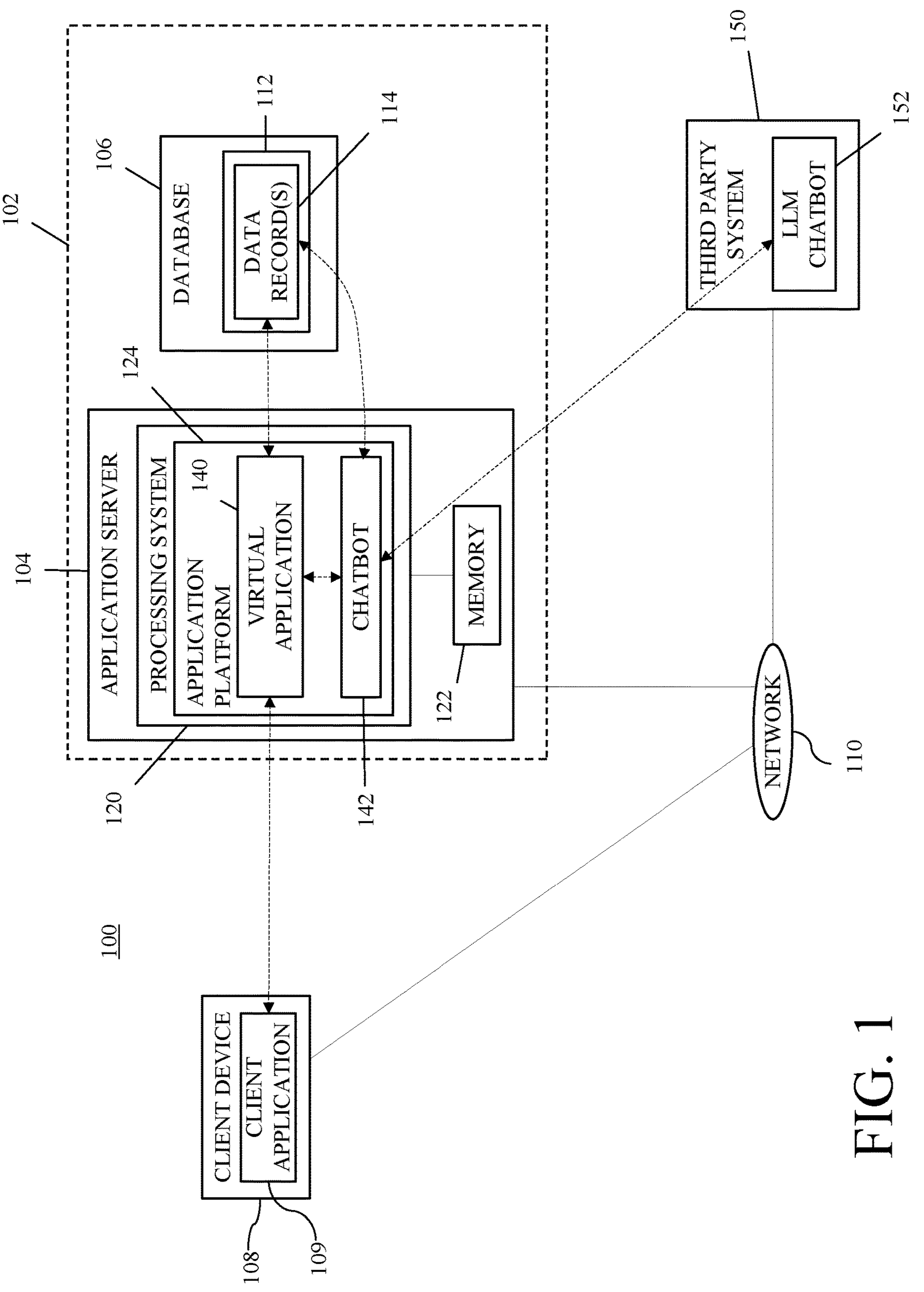
FIG. 1 is a block diagram depicting an exemplary computing system depicting an environment suitable for implementing aspects of the subject matter described herein in accordance with one or more implementations.

The subject matter described herein generally relates to computing systems and methods for automatically generating automated responses to a conversational user input using a large language model-based chatbot by grounding the large language model (LLM) using a chunk of text data that is semantically similar to the conversational user input. Rather than relying on chunks of text data that are chunked or divided primarily based on input criteria or other input restrictions associated with using the LLM (e.g., maximum LLM input size constraints, fixed buffer sizes, etc.) or other delimiters, the subject matter described herein generates secondary chunks that merge respective subsets of text data from adjacent (or consecutive) primary chunks and span the boundary between those primary chunks. In this regard, the secondary chunks amalgamate, coalesce or otherwise combine portions of the primary chunks across the respective boundaries between respective pairs of consecutive primary chunks, so that the boundary-coalescing secondary chunks capture the semantic meaning of the text data on both sides of the boundary. When a secondary boundary-coalescing chunk has the greatest semantic similarity or relevance to a conversational user input, that secondary chunk may be utilized to improve the grounding of the LLM, and thereby improve the relevance and/or correctness of the response received from the LLM.

In exemplary implementations, the text data to be chunked generally represents supplemental or auxiliary information that explains subject matter or otherwise provides contextual information that may be outside the scope of the LLM training data but which may otherwise be useful for grounding the LLM with respect to a particular input query or request, such as, for example, information specific to a particular product, service, business, individual(s), industry, and/or the like. In this regard, text data for chunking may be obtained from any sort of file, object, web page or other potential container or source of text content. In some implementations, the text data could include structured text content (e.g., a document file, a database object, and/or the like) where there are existing classifications, delimiters or other logical breakdowns of the text in the form of sections, sub sections, fields, headings, pages and/or the like, while in other implementations, the text data could be free form, where there is no existing classifications, delimiters or other logical breakdowns of the text content in form of sections, sub sections, headings, pages and/or the like, such as, for example, a free form stream of transcribed audio or other speech-to-text data from a meeting discussion.

In exemplary implementations, the text data is divided into an ordered sequence of multiple distinct or unique primary chunks based at least in part on one or more input criteria associated with an LLM service, for example, by dividing the text data into chunks or blocks of text that are less than or equal to a maximum allowable number of words, characters or size of text data capable of being accepted by the LLM service for grounding purposes. In various implementations, in addition to using input criteria associated with the LLM service, natural language processing (NLP) techniques may be employed to divide the text data into primary chunks in concert with the input criteria to facilitate identifying words, sentences and/or paragraphs to generate the primary chunks with meaningful boundaries between chunks (e.g., rather than truncating words, sentences and/or paragraphs across primary chunks). Thus, each primary chunk may effectively represent a meaningfully delimited paragraph, block or segment of text which is composed of multiple words and sentences of the input text data that is distinct from the other primary chunks, such that there is no overlap between primary chunks, with each nonoverlapping primary chunk satisfying the input criteria associated with grounding the LLM service.

As described in greater detail below, after creating the primary chunks, boundary-coalescing secondary chunks are automatically generated that span the boundaries between pairs of adjacent (or consecutive) primary chunks by merging a subset of the text data of a preceding primary chunk adjacent to the boundary with another boundary-adjacent subset of the text data of a following primary chunk. In one or more exemplary implementations, the input criteria associated with the LLM service are utilized to maintain the boundary-coalescing secondary chunks within the size constraints associated with the LLM service or otherwise ensure the boundary-coalescing secondary chunks satisfy the input criteria associated with the LLM service, so that any one of the secondary chunks is capable of being accepted by the LLM service for grounding purposes. Similar to the primary chunks, in various implementations, NLP techniques may also be employed when merging the subsets of text data from the primary chunks, for example, to identify words, sentences, paragraphs and/or other delimiters within the boundary-adjacent subsets of text data to generate coherent secondary chunks that span the boundaries without truncating words, sentences and/or the like. Thus, each secondary chunk may effectively capture the semantic content of the text data across the primary chunk boundaries by overlapping the adjacent boundary-adjacent subsets of text data of the different bordering primary chunks in a meaningful way.

In response to receiving a conversational input to a user interface that is relevant to a particular instance of text data that has been previously chunked (e.g., an input query or request relating to a particular product, service, business, individual(s), industry, and/or the like), the conversational input is compared to both the primary and secondary chunks for that particular instance of text data to identify the chunk that is most semantically similar or relevant to the conversational user input. Thus, when the conversational user input is most semantically similar or relevant to a secondary chunk, the secondary chunk may be input to the LLM service in concert with the conversational user input to provide context and ground the LLM service using the secondary chunk, thereby improving the correctness and/or relevance of the response to the conversational user input generated by the LLM service. As a result, the response to the conversational input provided at the user interface is improved by using a boundary-coalescing secondary chunk rather than a less semantically relevant primary chunk that was generated based on LLM input constraints or other criteria which may be semantically arbitrary or otherwise independent of context.

In exemplary implementations, to identify a semantically similar chunk of text data, the conversational user input to a user interface is input to an encoder or other model or algorithm that generates a corresponding numerical vector or other numerical representation of the conversational user input. The numerical representation of the current conversational user input is compared to the corresponding numerical representations of the respective primary and secondary chunks previously generated from the text data to identify the semantically similar chunk, for example, by using cosine similarity and/or applying a clustering technique or algorithm to identify one or more semantically similar chunks having numerical vector representations that are within a threshold distance of the numerical vector representation of the current conversational user input.

In one or more exemplary implementations, the conversational user inputs and responses described herein are unstructured and free form using natural language that is not constrained to any particular syntax or ordering of speakers or utterances thereby. In this regard, an utterance should be understood as a discrete uninterrupted chain of language provided by an individual conversation participant or actor or otherwise associated with a particular source of the content of the utterance, which could be a human user or speaker (e.g., a customer, a sales representative, a customer support representative, a live agent, and/or the like) or an automated actor or speaker (e.g., a "chat-bot" or other automated system). For example, in a chat messaging or text messaging context, each separate and discrete message that originates from a particular actor that is part of the conversation constitutes an utterance associated with the conversation, where each utterance may precede and/or be followed by a subsequent utterance by the same actor or a different actor within the conversation. In this regard, the conversational user input that functions as the input prompt for which an automated response is to be generated may be constructed from one or more utterances by the same actor within a conversation, and is not necessarily limited to an individual message or utterance. Additionally, it should be noted that although the subject matter may be described herein in the context of conversations (e.g., chat logs, text message logs, call transcripts, comment threads, feeds and/or the like) for purposes of explanation, the subject matter described herein is not necessarily limited to conversations and may be implemented in an equivalent manner with respect to any particular type of database record or database object including text fields.

FIG. 1 depicts an exemplary depicts an exemplary computing system 100 including a database system 102 configurable to provide an application platform 124 capable of supporting conversational interactions with a user of a client device 108. In exemplary implementations, the database system 102 is capable of provisioning instances of one or more virtual applications 140 to client applications 109 at client devices 108 over a communications network 110 (e.g., the Internet or any sort or combination of wired and/or wireless computer network, a cellular network, a mobile broadband network, a radio network, or the like), where the virtual applications 140 invoke, include or otherwise incorporate a conversational interaction service 142 that is configurable to support conversational interactions and interface with an LLM-based chatbot service 152, as described in greater detail below. For purposes of explanation, the conversational interaction service 142 may alternatively be referred to herein as a chatbot service in the context of an exemplary implementation providing substantially real-time conversational interactions with an end user the context of a chat window associated with an instance of the virtual application 140; however, it should be appreciated that the subject matter described herein is not limited to chatbots and the conversational interaction service 142 may be configurable to support any number of different types or forms of conversational interactions in an automated manner (e.g., by automatically generating responsive emails, text messages, and/or the like). Accordingly, it should be appreciated that FIG. 1 is a simplified representation of a computing system 100 and is not intended to be limiting.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receivers, transceivers, wired network interface controllers (e.g., an Ethernet adapter), wireless adapters or other suitable network interfaces that support communications to/from the network 110 coupled thereto. The application server 104 also includes or otherwise accesses a data storage element 122 (or memory), which may be realized as a local disk, hard disk, random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. Some implementations may support text-to-speech, speech-to-text, or other speech recognition systems, in which case the client device 108 may include a microphone or other audio input device that functions as the user input device, with a speaker or other audio output device capable of functioning as an output device. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as hypertext transport protocol secure (HTTPS). In this manner, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Still referring to FIG. 1, in exemplary implementations, the code or other programming instructions associated with the application platform 124 and/or the virtual web applications 140 may be configurable to incorporate, invoke or otherwise include a chatbot service 142, which generally represents a software component capable of providing or otherwise supporting an automated agent or chatbot service capable of automatically exchanging chat messages or providing other conversational responses, which may include text-based messages that include plain-text words only, and/or rich content messages that include graphical elements, enhanced formatting, interactive functionality, or the like. Depending on the implementation, the chatbot service 142 can be integrated with or otherwise incorporated as part of the virtual application 140, or be realized as a separate or standalone process, application programming interface (API), software agent, or the like that is capable of interacting with the client device 108 independent of the virtual application 140. In practice, the chatbot service 142 may incorporate or otherwise reference a vocabulary of words, phrases, phonemes, or the like associated with a particular language that supports conversational interaction with the user of the client device 108. For example, the vocabulary may be stored or otherwise maintained at the database system 102 (e.g., in the database 106 or memory 122) and utilized by the chatbot service 142 to provide speech recognition or otherwise parse and resolve text or other conversational input received via a graphical user interface (GUI) or chat window associated with the chatbot service 142, as well as to generate or otherwise provide conversational output (e.g., text, audio, or the like) to the client device 108 for presentation to the user (e.g., in response to received conversational input).

In exemplary implementations, the chatbot service 142 receives or otherwise obtains a conversational input from a user of the client device 108 (e.g., via client application 107 and network 110) and parses the conversational input using the conversational vocabulary associated with the chatbot service 142 to identify or otherwise discern an intent of the user or another action that the user would like to perform and automatically respond in a corresponding manner, including by updating the chat window or other GUI display associated with the conversation with the chatbot service 142 to include a graphical representation of a conversational response generated by the chatbot service 142 responsive to the conversational user input prompt received from the user. In this manner, a user of a client device 108 interacts or otherwise communicates with the chatbot service 142 via an associated GUI display within the client application 109 (e.g., a chat window) to transmit or otherwise provide conversational user input in the context of a conversation with the chatbot service 142. Depending on the implementation, the conversational input may be received by the user selecting or otherwise activating a GUI element presented within the chat window, or the user may input (e.g., via typing, swiping, touch, voice, or any other suitable method) a conversational string of words in a free-form or unconstrained manner, which is captured by a user input device of the client device 108 and provided over the network 110 to the application platform 124 and/or the chatbot service 142 via the client application 109. The chatbot service 142 then parses or otherwise analyzes the conversational input using natural language processing (NLP) to identify the intent or other action desired by the user based on the content, syntax, structure and/or other linguistic characteristics of the conversational input.

In one or more implementations, when the chatbot service 142 determines it is unable to ascertain the intent of a received conversational user input or is otherwise unable to respond to the received conversational user input based on the vocabulary and/or other data that is accessible to or otherwise associated with the chatbot service 142, the chatbot service 142 analyzes the received conversational user input to determine whether or not to forward the received conversational user input as an input prompt to a LLM-based chatbot service 152 for generating a corresponding LLM-based automated conversational response to the received conversational user input. In this regard, the LLM-based chatbot service 152 may be realized as an application programming interface (API), software agent, or the like that is capable of receiving a textual input prompt and providing a corresponding natural language textual response to the received input prompt using a LLM and corresponding artificial intelligence or machine learning techniques such that the natural language textual response represents a logical and coherent response to the textual input prompt.

In one or more exemplary implementations, the LLM-based chatbot service 152 is hosted or otherwise implemented at an external computing system 150 on the network 110. The external computing system 150 generally includes at least one server communicatively coupled to the network 110 to support access to the LLM-based chatbot service 152. In this regard, in some implementations, the external computing system 150 is physically and logically distinct from the database system 102 and/or the application platform 124. For example, the external computing system 150 may be owned, controlled, or otherwise operated by a third party different from the parties that own, control and/or operate the database system 102 and/or the application platform 124. That said, in other implementations, the external computing system 150 may be affiliated with the same party that owns, controls and/or operates the database system 102 and/or the application platform 124.

Figure 2:
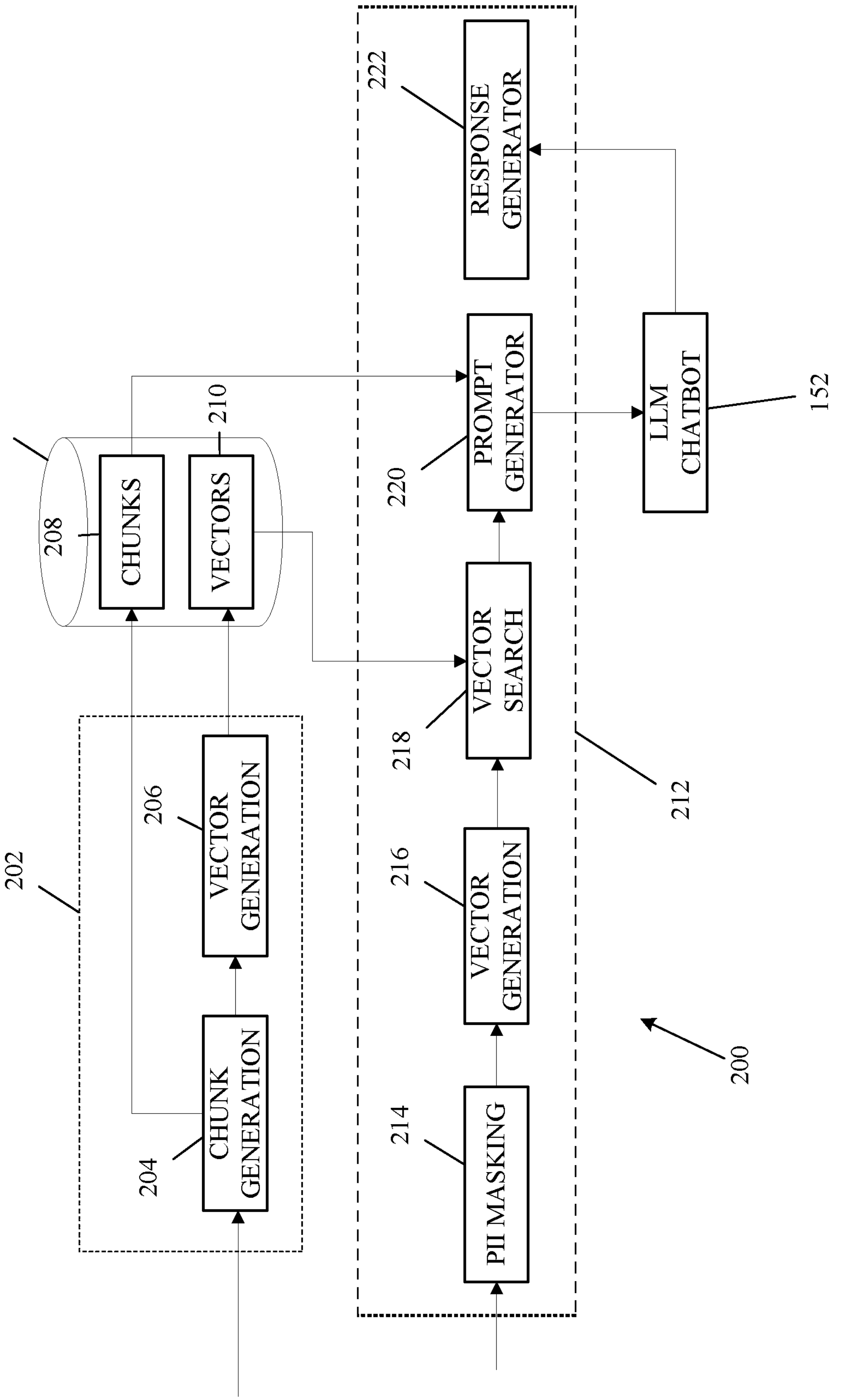
FIG. 2 is a schematic block diagram of an exemplary large language model (LLM) grounding service suitable for implementation in connection with a chatbot service in the computing system of FIG. 1 in accordance with one or more implementations.

FIG. 2 depicts an exemplary implementation of an LLM grounding service 200 that may be integrated with, incorporated into, invoked by or otherwise implemented by the chatbot service 142 to analyze or otherwise monitor conversational user inputs received by the chatbot service 142 and select or otherwise identify contextually relevant and semantically similar grounding data to be provided to an LLM-based chatbot service 152 prior to sending a respective conversational user input to the LLM-based chatbot service 152. In this regard, the depicted components generally represent the configured software components or subprocesses associated with the LLM grounding service 200 that may be stored or otherwise maintained as code or other executable programming instructions that are executed by a processing system (e.g., processing system 120) in concert with generating the chatbot service 142 associated with a virtual web application 140.

Still referring to FIG. 2 with continued reference to FIG. 1, in exemplary implementations, the LLM grounding service 200 includes a text data chunking service 202 that is configurable to receive input text data from various sources and divide the text data into corresponding primary and secondary chunks 208 to be stored or otherwise maintained in a data storage element 230 (e.g., the database 106, memory 122, and/or the like) in association with numerical vector representations 210 (or vectors) of the respective grounding chunks 208. In this regard, depending on the particular implementation or configuration, the text data chunking service 202 may periodically and/or asynchronously obtain instances of text data suitable for use in grounding the LLM-based chatbot service 152 (e.g., by periodically crawling web pages, analyzing data records 112 or other files in the database 106 for new records and/or files, and/or the like) to develop a library or catalog of grounding information consisting of sets of grounding chunks 208 and vectors 210 for different instances of text data. That said, in other implementations, a user may be capable of identifying (e.g., using a URL address or other location), uploading, inputting or otherwise providing the particular instance of text data the user would like to use to ground the LLM-based chatbot service 152 in connection with a particular query or request. Accordingly, the subject matter described herein is not limited to any particular manner or scheme for obtaining an instance of text data to be utilized for chunking and/or grounding, nor is the subject matter described herein limited to any particular type or format of input text data to be utilized for chunking and/or grounding.

The text data chunking service 202 includes a grounding chunk generation component 204 (or chunk generator) that generally represents the component of the LLM grounding service 200 that is configurable to obtain text data from a web page, database record, file, object or other container or source of text content and divide the input text data into corresponding primary chunks and boundary-coalescing secondary chunks using the input criteria associated with the LLM-based chatbot service 152 and potentially other NLP techniques, as described herein. For each instance of input text data, the chunk generation component 204 stores or otherwise maintains the ordered sequence of primary chunks 208 for that instance of input text data and secondary chunks 208 spanning the adjacent primary chunk boundaries for that instance of input text data in the data storage element 230 with a unique identifier maintaining an association between the respective chunks 208 for that instance of input text data and the corresponding source or other identifier(s) of the input text data.

After generating the primary and secondary chunks 208 for the input text data, the chunk generation component 204 provides the chunks 208 to a vector generation component 206, which generally represents the encoder or other component of the LLM grounding service 200 that is configurable to perform vector encoding, word embedding, or another suitable technique to generate, for each respective chunk 208, a corresponding numerical vector representation of the semantic and/or syntactic content of that chunk 208. The vector generation component 206 stores or otherwise maintains the vectors 210 for the respective chunks 208 in the data storage element 230 in a manner that maintains an association between the numerical representation vector 210 and the respective chunk 208 (e.g., using the unique identifier that maintains an association between a respective chunk 208, its associated numerical representation vector 210, and the corresponding source or other identifier(s) of the input text data).

Still referring to FIG. 2, in exemplary implementations, the LLM grounding service 200 also includes an LLM interaction service 212 that is configurable to receive input text data corresponding to a conversational input to a user interface at a client application 109 and utilize the chunks 208 to generate one or more input prompts to an LLM-based chatbot service 152 corresponding to the conversational user input that are grounded using one or more of the chunks 208. The LLM interaction service 212 provides the grounded input prompt(s) to the LLM-based chatbot service 152 and receives a resulting conversational response received from the LLM-based chatbot service 152 that is responsive to the conversational input and influenced by text data of the selected grounding chunk(s) 208.

In the illustrated implementation, the LLM interaction service 212 includes an identification masking component 214 that generally represents the component of the LLM grounding service 200 that is configurable to parse, scan or otherwise analyze the textual content of a received conversational user input to detect or otherwise identify any personally identifiable information (PII) contained within the received conversational user input and automatically remove or replace any PII terms within the conversational user input. For example, the PII masking component 214 may utilize parts-of-speech tagging or other NLP techniques to identify names or addresses of individuals, organizations, and/or the like contained within the conversational user input and automatically replace any PII terms within the conversational user input with generic nouns or other placeholders that are semantically consistent with the PII terms, resulting in an augmented conversational user input. In various implementations, the PII masking component 214 may tag, store or otherwise maintain data or information identifying the PII terms that were removed from the received conversational user input or otherwise replaced within the augmented conversational user input and provide corresponding indicia to a response generation component 222 (or response generator) for restoring the PII terms in any response to the conversational user input prior to returning that response to the chatbot service 142 and/or virtual web application 140. After masking any PII terms, in exemplary implementations, the conversational user input is provided to a vector generation component 216 that generally represents the component of the LLM interaction service 212 that corresponds to the vector generation component 206 of the text data chunking service 202 to translate or otherwise convert the conversational user input into a corresponding numerical representation, for example, by performing vector encoding, word embedding, or another suitable technique to generate a corresponding numerical vector representation of the semantic and/or syntactic content of the conversational user input.

After converting the received text data of the received conversational user input into a corresponding numerical vector representation, a vector search component 218 of the LLM interaction service 212 is configurable to compare the numerical representation of the current conversational user input to the stored vectors 210 corresponding to the various potential grounding chunks 208 maintained in the grounding data storage element 230 to identify a semantically similar vector 210 for a grounding chunk 208 that is within a threshold degree of similarity of the current conversational user input. For example, in one implementation, for the numerical representation of the current conversational user input of interest, the vector search component 218 analyzes the numerical representations of the different potential vectors 210 for grounding chunks 208 to identify the vector 210 that is closest to the numerical vector representation of the current conversational user input (e.g., by maximizing the cosine similarity, minimizing the Euclidean distance, and/or the like). In some implementations, the vector search component 218 also verifies that the similarity, difference and/or distance between the closest vector 210 and the conversational user input is within a grounding inclusion threshold (e.g., a cosine similarity greater than a threshold, a Euclidean distance less than a threshold, and/or the like). In some implementations, the vector search component 218 may utilize contextual information associated with the conversational user input (e.g., indicia of the user, organization, tenant, product, service, virtual web application, and/or the like associated with the conversational user input) to filter or otherwise limit the potential grounding vectors 210 to be searched or analyzed for that conversational user input. For example, the potential grounding vectors 210 and grounding chunks 208 may be maintained in one or more tables that facilitate maintaining an between the grounding chunks 208, the grounding vectors 210 and/or the grounding information source and corresponding contextual attributes (e.g., product identifiers, service identifiers, organization identifiers, user identifiers and/or the like) that facilitate limiting the potential search space of the grounding vectors 210 to a subset of grounding vectors 210 that is most likely to be relevant to the current conversational user input.

It should be appreciated that any number of different techniques or algorithms may be utilized to identify a subset of one or more vectors (or grounding chunks) having numerical representations within a desired threshold distance or semantic similarity of the current conversational user input, and the subject matter described herein is not limited to any particular manner for identifying the vectors (or grounding chunks). In this regard, it should be noted that in some implementations, when the vector search component 218 fails to identify a sufficiently semantically similar grounding vector 210, the vector search component 218 may automatically provide the current conversational user input to a prompt generation component 220 for generating an input prompt to the LLM-based chatbot service 152 without grounding.

When a semantically similar grounding vector 210 is identified that satisfies any other grounding inclusion thresholds or criteria, the vector search component 218 provides one or more identifiers or other indicia associated with that selected vector 210 to a prompt generation component 220 (or prompt generator 220), which generally represents the component of the LLM grounding service 200 that is configurable to obtain text data of the grounding chunk 208 corresponding to the selected grounding vector 210 and generate one or more grounded input prompts to be provided to the LLM-based chatbot service 152 based on the text data of the selected grounding chunk 208 and the text data of the current conversational user input. In some implementations, the prompt generator 220 may concatenate or otherwise append the text data of the current conversational user input (which may be masked as described above) to the retrieved text data of the selected grounding chunk 208 to construct an input prompt that includes grounding information preceding a corresponding request or query provided by the user. For example, in one or more implementations, the prompt generator 220 may store, maintain or otherwise access one or more prompt templates that may be utilized to generate an input prompt for the LLM-based chatbot service 152, where the prompt templates may be specific to a particular user, tenant, organization or other resource owner, the particular instance of the virtual application 140, the particular LLM-based chatbot service 152, and/or the like, and in exemplary implementations, the prompt templates include placeholders for the grounding information, the user input query, and other prompt engineering controls (e.g., to reduce bias, abuse, misuse, and/or the like). After selecting an appropriate prompt template for the current context, the prompt generator 220 may automatically fill the grounding information placeholder of the selected prompt template with the selected grounding chunk 208, automatically fill the user input query placeholder with the text data of the current conversational user input, and automatically set or otherwise apply the desired prompt engineering controls to arrive at a grounded input prompt that is ready for submission to the LLM-based chatbot service 152.

After constructing the appropriate grounded input prompt (s), the prompt generator 220 automatically provides the input prompt(s) to the LLM-based chatbot service 152, which, in turn generates a conversational response that is responsive to the conversational user input in a manner that is influenced by the accompanying grounding information. In the illustrated implementation, the resulting conversational response received from the LLM-based chatbot service 152 is provided to a response generation component 222 (or response generator), which generally represents the component of the LLM grounding service 200 that is configurable to automatically modify or augment the conversational response provided by the LLM-based chatbot service 152 as needed before providing the automated response generated by the LLM-based chatbot service 152 to the chatbot service 142 for automatically updating the chat window or other GUI display associated with a conversation with the chatbot service 142. In this regard, the response generator 222 may utilize parts-of-speech tagging and/or other NLP techniques to analyze the conversational response from the LLM-based chatbot service 152 to construct or otherwise generate an augmented response that includes any PII terms that were extracted by the PII masking component 214. Thus, the resulting response provided by the response generator 222 may have substantially the same intent and similar syntax or structure as the conversational response provided by the LLM-based chatbot service 152 but include one or more of the previously-extracted PII terms associated with the current conversational user input, and/or other contextual information associated with the current conversational user input (e.g., data or information associated with the particular user, organization, tenant and/or the like).

The response generator 222 transmits or otherwise provides the automated conversational response to the chatbot service 142 for automatically updating the chat window or other GUI display associated with a conversation with the chatbot service 142. In this regard, a graphical representation of the textual content of the automated response may be presented within the chat window or other chat log as an utterance on behalf of the chatbot service 142 that follows the one or more utterances including the textual content of the preceding conversational user input(s) that the automated response is responsive to.

By virtue of the text data chunking service 202 generating potential grounding chunks 208 (and corresponding vectors 210) that include boundary-coalescing secondary chunks 208 that span the boundaries between the primary chunks 208, the vector search component 218 is more likely to identify a grounding vector 210 having a greater semantic similarity to a received conversational user input. In this regard, the boundary-coalescing secondary chunks 208 mitigate the likelihood of the input criteria associated with the LLM-based chatbot service 152 or other primary chunking criteria impairing the performance of the LLM interaction service 212 dividing the grounding text data in a manner that is semantically and/or syntactically arbitrary by selecting respective subsets of adjacent primary chunks 208 to span that boundary to capture and aggregate text data that is more semantically relevant to the conversational user input. Thus, when the vector search component 218 selects or otherwise identifies the vector 210 for a secondary chunk 208 as having the greatest cosine similarity or otherwise being most semantically similar to the numerical vector representation of the current conversational user input, the prompt generator 220 is capable of constructing a grounded input prompt that is more semantically and/or contextually relevant to the conversational user input relative to reliance solely on primary chunks 208. As a result, an improved conversational response may be received from the LLM-based chatbot service 152 relative to reliance solely on primary chunks 208 for grounding.

Figure 3:
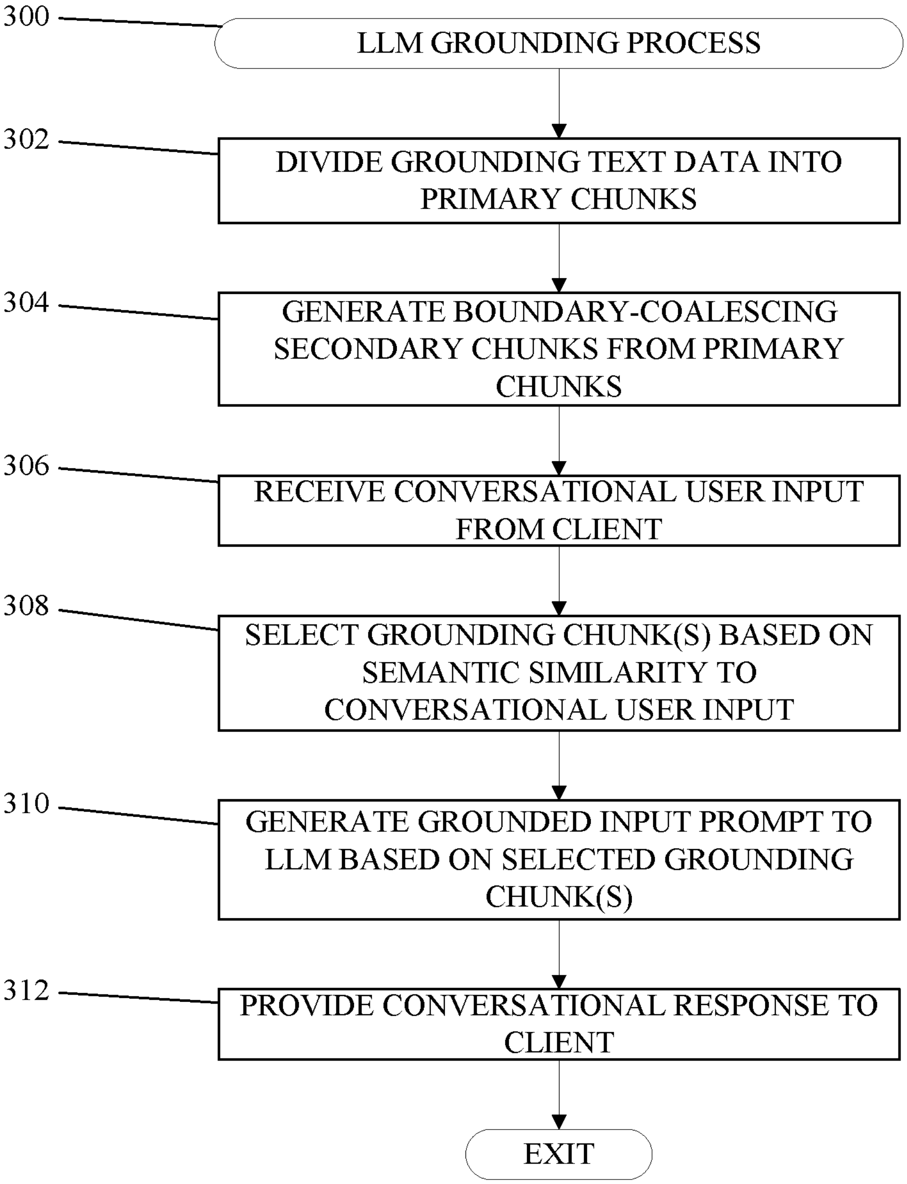
FIG. 3 is a flow diagram illustrating a LLM grounding process suitable for implementation by the LLM grounding service of FIG. 2 in the computing system of FIG. 1 in accordance with one or more exemplary implementations.

FIG. 3 depicts an exemplary flow diagram of an LLM grounding process 300 suitable for implementation by a chatbot service or other service associated with a virtual web application to manage interaction with an LLM-based chatbot service and perform additional tasks, functions, and/or operations described herein. For illustrative purposes, the following description may refer to elements mentioned above in connection with FIGS. 1-2. For purposes of explanation, the LLM grounding process 300 may be described herein primarily in the context of an LLM grounding service 200 associated with a chatbot service 142 supported by an application platform 120 that provides virtual web applications 140 to any number of different client devices 108. It should be appreciated that the LLM grounding process 300 may include any number of additional or alternative tasks, the tasks need not be performed in the illustrated order and/or the tasks may be performed concurrently, and/or the LLM grounding process 300 may be incorporated into a more comprehensive procedure or process having additional functionality not described in detail herein. Moreover, one or more of the tasks shown and described in the context of FIG. 3 could be omitted from a practical implementation of the LLM grounding process 300 as long as the intended overall functionality remains intact.

Referring to FIG. 3, with continued reference to FIGS. 1-2, in exemplary implementations, the LLM grounding process 300 receives or otherwise obtains textual grounding information from a source and automatically divides the grounding text data into a plurality of distinct primary chunks in accordance with one or more primary chunking criteria (task 302). For example, as described above, grounding text data may be obtained by a text data chunking service 202 from a web page, database record, file, object or other container or source of text content and automatically divided into primary grounding chunks based on one or more input criteria or other input restrictions associated with using an LLM-based chatbot service 152 (e.g., maximum LLM input size constraints, fixed buffer sizes, etc.). The grounding text data is divided into mutually exclusive and distinct subsets of the grounding text data, resulting in a set of nonoverlapping primary grounding chunks 208 that are capable of being input to the LLM-based chatbot service 152 or otherwise incorporated or included in a grounded input prompt to be generated and input to the LLM-based chatbot service 152. As described above, the primary chunking criteria may also include or otherwise incorporate semantic and/or syntactic criteria utilized in concert with NLP techniques to divide the text data into meaningfully delimited primary chunks 208 or otherwise provide meaningful boundaries between chunks. The primary chunks 208 may then be stored or otherwise maintained in association with the particular source of grounding information and/or other contextual information associated with the grounding information (or the source of the grounding information) in a data storage element 106, 230.

After dividing the textual grounding information into nonoverlapping primary chunks, the LLM grounding process 300 continues by generating a plurality of boundary-coalescing secondary chunks from the primary chunks (task 304). As described above, the chunk generator 204 automatically generates secondary chunks that span the boundaries between respective pairs of adjacent (or consecutive) primary chunks by merging a subset of the text data of a preceding primary chunk adjacent to the boundary with another boundary-adjacent subset of the text data of a following primary chunk. In this manner, the previously-generated nonoverlapping primary chunks 208 are utilized to derive boundary-coalescing secondary chunks 208 that merge subsets of text data from adjacent pairs of consecutive primary chunks 208 to overlap those portions of the respective pairs of adjacent primary chunks 208 that are adjacent to the boundary between the respective pair of adjacent primary chunks 208. Thus, the boundary-coalescing secondary chunks 208 are mutually exclusive, distinct or otherwise nonoverlapping with respect to one another, while overlapping constituent boundary-adjacent portions of their respective pairs of adjacent primary chunks 208. In a similar manner to the primary chunks 208, the chunk generator 204 may also apply the input criteria associated with the LLM-based chatbot service 152 and/or other primary chunking criteria when generating the boundary-coalescing secondary chunks 208 to ensure the boundary-coalescing secondary chunks 208 will also satisfy the input criteria associated with the LLM-based chatbot service 152 and effectively capture the semantic content of the consecutive subsets of text data being merged across a respective primary chunk boundary in a semantically and/or syntactically meaningful way.

After generating respective sets of primary chunks and boundary-coalescing secondary chunks for a particular instance of textual grounding information, the LLM grounding process 300 continues by receiving or otherwise obtaining a conversational user input from a client and selecting or otherwise identifying at least one of the chunks for grounding based on semantic similarity between the respective chunk(s) and the conversational user input (tasks 306, 308). For example, as described above, the vector generator 206 of the text data chunking service 202 may generate corresponding numerical vector representations of the respective primary and secondary chunks 208 and store those numerical vectors 210 in association with the respective chunks 208. An LLM interaction service 212 may include a corresponding vector generator 216 that converts a received conversational user input into a numerical vector representation in an equivalent manner before providing the numerical vector representation of the conversational user input to a vector search component 218 to identify one or more grounding chunk vectors 210 that are most semantically similar to the conversational user input, for example, by identifying the grounding chunk vector 210 having the greatest cosine similarity with respect to the conversational user input vector. In this manner, when the textual content of a boundary-coalescing secondary chunk is most semantically similar to the conversational user input, that boundary-coalescing secondary chunk may be selected and utilized for grounding an input prompt based on the conversational user input in lieu of reliance on a less semantically similar primary chunk.

After selecting a grounding chunk based on semantic similarity, the LLM grounding process 300 automatically generates a grounded input prompt for an LLM-based chatbot service corresponding to the received conversational user input using the selected grounding chunk (task 310). The LLM grounding process 300 provides the grounded input prompt to the LLM-based chatbot service to receive a corresponding conversational response from the LLM-based chatbot service that is automatically provided to the client responsive to the received conversational user input (task 312). As described above, when the prompt generator 220 may construct a grounded input prompt based on the subset of text data contained in the selected grounding chunk 208 and the text of the conversational user input and then provides the resulting grounded input prompt to the LLM-based chatbot service 152 for generating a correspondingly grounded conversational response to the conversational user input that reflects the grounding information contained in the selected grounding chunk 208. Thus, when the textual content of a boundary-coalescing secondary chunk is more semantically similar to the conversational user input, the resulting conversational response from the LLM-based chatbot service 152 grounded using the boundary-coalescing secondary chunk is more likely to be relevant, correct and/or accurate or is otherwise improved relative to the likely conversational response that would result from reliance on a less semantically similar primary chunk.

A response generator 222 of an LLM interaction service 212 may deanonymize or otherwise augment the grounded conversational response from the LLM-based chatbot service 152 to restore relevant PII or other information that was otherwise obfuscated or removed from the conversational user input and corresponding grounded input prompt before providing the resulting augmented grounded conversational response from the LLM-based chatbot service 152 to the chatbot service 142 and/or virtual web application 140 for presentation within a chat window or other user interface at the client device 108. For example, the LLM grounding service 200 may automatically communicate or otherwise provide the textual content of the grounded conversational response from the LLM-based chatbot service 152 to the chatbot service 142, which, in turn utilizes the received textual content to dynamically update the conversation at the client device 108. For example, in exemplary implementations, the chatbot service 142 dynamically updates the graphical representation of the conversation depicted within the chat window or other user interface associated with the virtual application 140 to include a graphical representation of the textual content of the grounded conversational response as an utterance on behalf of the chatbot service 142 that is responsive to or otherwise follows the one or more utterances associated with the user that contain the conversational user input that formed the basis of the grounded input prompt that the grounded LLM chatbot response is responsive to. In this manner, the user of the client device 108 may perceive the received conversational response as having emanated from the chatbot service 142 and/or the LLM-based chatbot service 152 without necessarily realizing that the depicted conversational response was grounded using a boundary-coalescing secondary chunk.

Figure 4:
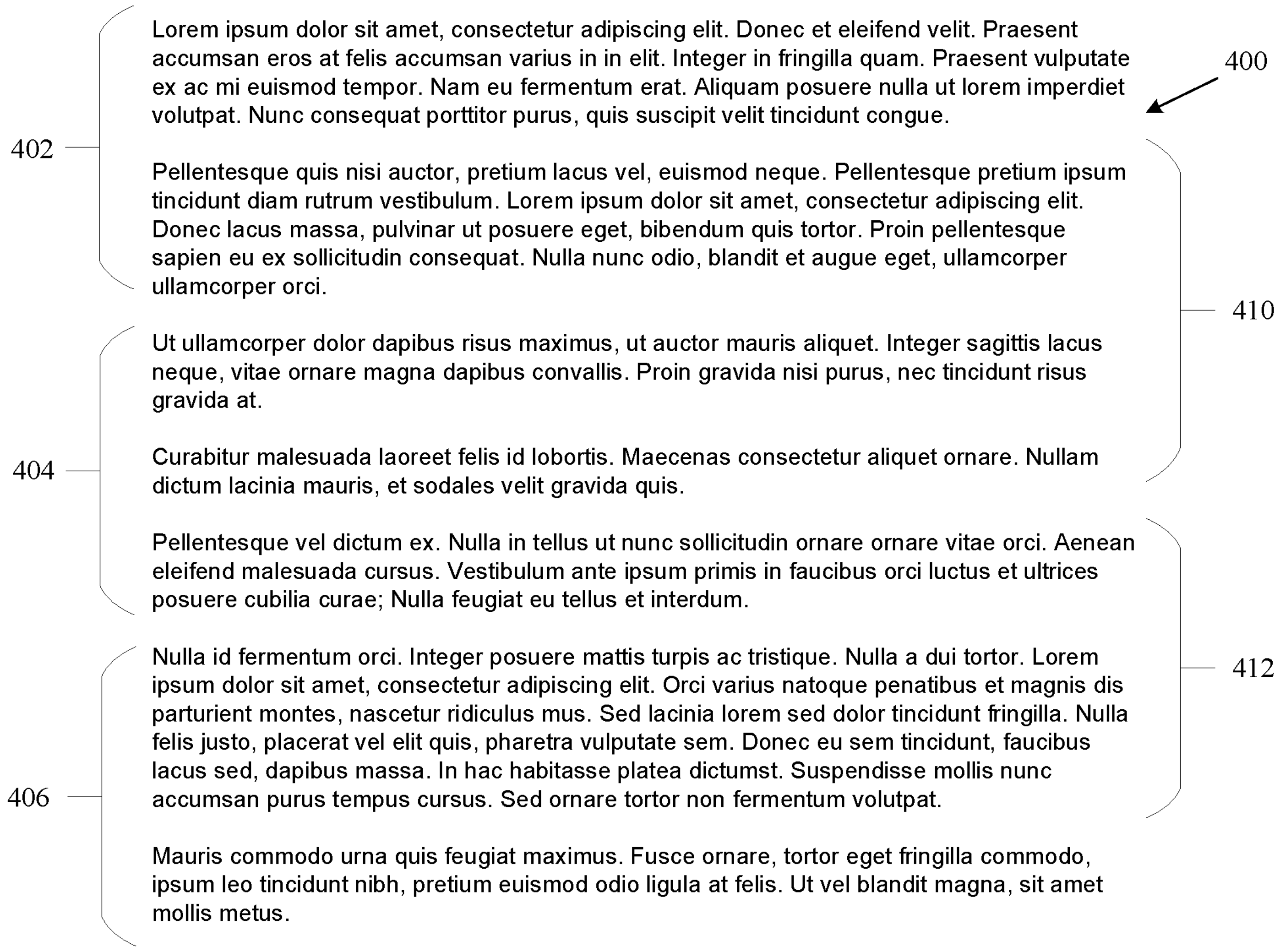
FIG. 4 depicts an example of textual grounding information divided into primary chunks and corresponding boundary-coalescing secondary chunks suitable for use by the LLM grounding service of FIG. 2 in connection with the LLM grounding process of FIG. 3 in accordance with one or more exemplary implementations.

FIG. 4 depicts an example of grounding text data 400 divided into a plurality primary chunks 402, 404, 406 including distinct, mutually exclusive, nonoverlapping subsets of the grounding text data 400 and a corresponding set of boundary-coalescing secondary chunks 410, 412 that span the boundaries between pairs of adjacent (or consecutive) primary chunks 402, 404, 406. For example, a first secondary chunk 410 merges the last paragraph of the first primary chunk 402 preceding the boundary with the second primary chunk 404 with the first two paragraphs of the second primary chunk 404 to form the first secondary chunk 410 that spans, overlaps or otherwise coalesces the boundary between the adjacent first and second primary chunks 402, 404. Similarly, the second secondary chunk 412 merges the last paragraph of the second primary chunk 404 preceding the boundary with the third primary chunk 406 with the first paragraph of the third primary chunk 406 to form the second secondary chunk 412 that spans, overlaps or otherwise coalesces the boundary between the adjacent second and third primary chunks 404, 406. At the same time, the boundary-coalescing secondary chunks 410, 412 are distinct, mutually exclusive and nonoverlapping with respect to one another.

Still referring to FIG. 4 with reference to FIGS. 2-3, by virtue of the LLM grounding service 200 and the LLM grounding process 300 described herein, one of the secondary chunks 410, 412 may be selected and utilized to ground an input prompt to an LLM to obtain an improved response relative to reliance on primary chunks 402, 404, 406 alone. For example, when the first paragraph of the third primary chunk 406 is most semantically similar to the conversational user input and the last paragraph of the second primary chunk 404 is the next most semantically similar to the conversational user input or is otherwise more semantically similar or relevant than the last paragraph of the third primary chunk 406, the secondary chunk 412 that includes both the first paragraph of the third primary chunk 406 and the last paragraph of the second primary chunk 404 may be utilized to ground the input prompt provided to the LLM. By including the more semantically relevant paragraph of the second primary chunk 404 instead of the less semantically relevant paragraph of the third primary chunk 406 when grounding the input prompt, the resulting response provide by the LLM is more likely to be accurate, correct or otherwise relevant by incorporating or leveraging the information gleaned from the relevant paragraph of the second primary chunk 404.

It should be appreciated that in practice, numerous different criteria or techniques may be employed to generate boundary-coalescing grounding chunks and the subject matter described herein is not necessarily limited to any particular implementation. For example, depending on the implementation, the boundary-coalescing grounding chunks may be generated using more restrictive criteria than the primary grounding chunks, for example, to limit the size or number of words, characters, sentences and/or paragraphs in a boundary-coalescing secondary chunk to a fraction or percentage of the size or number of words, characters, sentences and/or paragraphs in a primary chunk (e.g., to provide boundary-coalescing secondary chunk one half the size of the primary chunks). Additionally, in some implementations, the boundary-coalescing grounding chunks may be generated symmetrically, for example, by incorporating substantially the same number of words, characters, sentences and/or paragraphs from each of the adjacent primary chunks being merged into the respective boundary-coalescing secondary chunk, while in other implementations, the boundary-coalescing grounding chunks may be generated asymmetrically by incorporating a greater and/or lesser number of words, characters, sentences and/or paragraphs from one of the adjacent primary chunks relative to the other adjacent primary chunk being merged into the respective boundary-coalescing secondary chunk. Moreover, the subject matter described herein is not limited to secondary chunks and in practice, additional layers or levels of chunks may be employed to improve grounding performance. For example, when boundary-coalescing secondary chunks are adjacent to one another, boundary-coalescing tertiary chunks may be generated in an equivalent manner to span boundaries between adjacent boundary-coalescing secondary chunks. In this regard, the chunking criteria utilized to generate the respective sets of primary, secondary and tertiary chunks may be configured or otherwise chosen in a manner that ensures the tertiary chunks are unique or otherwise do not match existing ones of the primary or secondary chunks.

In one exemplary implementation, the chunk generator 204 of the text data chunking service 202 is configurable to generate multiple different sets of chunks 208 from an input document using different chunking criteria. For example, the primary chunks may be generated using HyperText Markup Language (HTML) tags to facilitate chunking a document in a semantically meaningful way (e.g., by dividing the text between different tags so a block of text having a particular HTML tag is assigned to a common primary chunk), while still applying a maximum size limit to ensure none of the primary exceed a maximum size limit, with the boundary-coalescing secondary chunks being generated to span the boundaries between primary chunks derived using the HTML tags. Additionally, the input document may also be divided into primary chunks using a fixed token size (e.g., a maximum number of characters, words, sentences and/or the like), with the boundary-coalescing secondary chunks being generated to span the boundaries between primary chunks divided based on the fixed token size. Thus, when grounding an input prompt, for a given document, the vector search component 218 may identify any one of a primary chunk generated using HTML tags, a primary chunk generated using a fixed token size, a boundary-coalescing secondary chunk spanning primary chunks generated using HTML tags, or a boundary-coalescing secondary chunk spanning primary chunks generated using the fixed token size, depending on the semantic similarity between the received user input and the respective grounding chunk identified by the vector search component 218, as described above.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
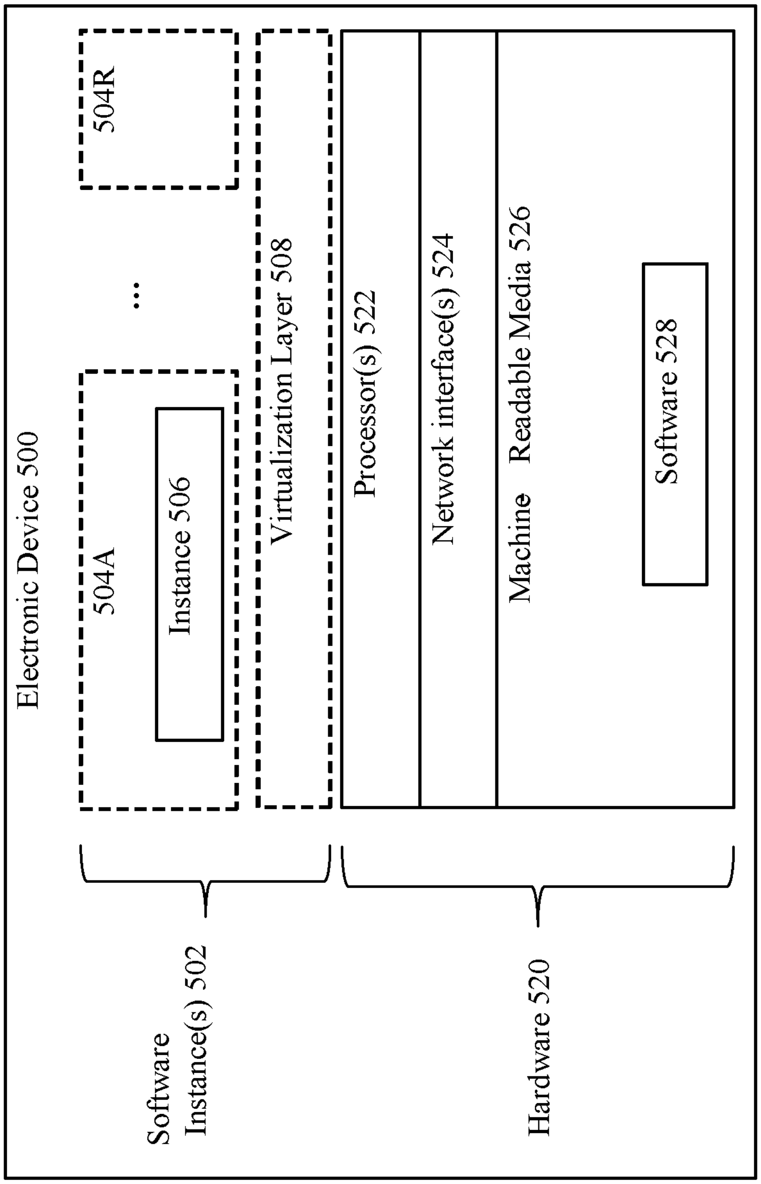
FIG. 5A is a block diagram illustrating an electronic device according to some exemplary implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients, server-side services (e.g., chatbot service 142, LLM grounding service 200, etc.) and client-side services may be implemented in one or more electronic devices 500. In one implementation: 1) each of the clients is implemented in a separate one of the electronic devices 500 (e.g., in end user devices where the software 528 represents the software to implement clients to interface directly and/or indirectly with the server-side services and/or client-side services (e.g., software 528 represents a web browser, a native client, a portal, a command-line interface, and/or an application programming interface (API) based upon protocols such as Simple Object Access Protocol (SOAP), Representational State Transfer (REST), etc.)); 2) the server-side services and/or client-side services is implemented in a separate set of one or more of the electronic devices 500 (e.g., a set of one or more server devices where the software 528 represents the software to implement the server-side services and/or client-side services); and 3) in operation, the electronic devices implementing the clients and the server-side services and/or client-side services would be communicatively coupled (e.g., by a network) and would establish between them (or through one or more other layers and/or or other services) connections for submitting requests to the server-side services and/or client-side services. Other configurations of electronic devices may be used in other implementations.

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where computer virtualization is used, during operation, an instance of the software 528 is executed within the software container 504A on the virtualization layer 508. In electronic devices where computer virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
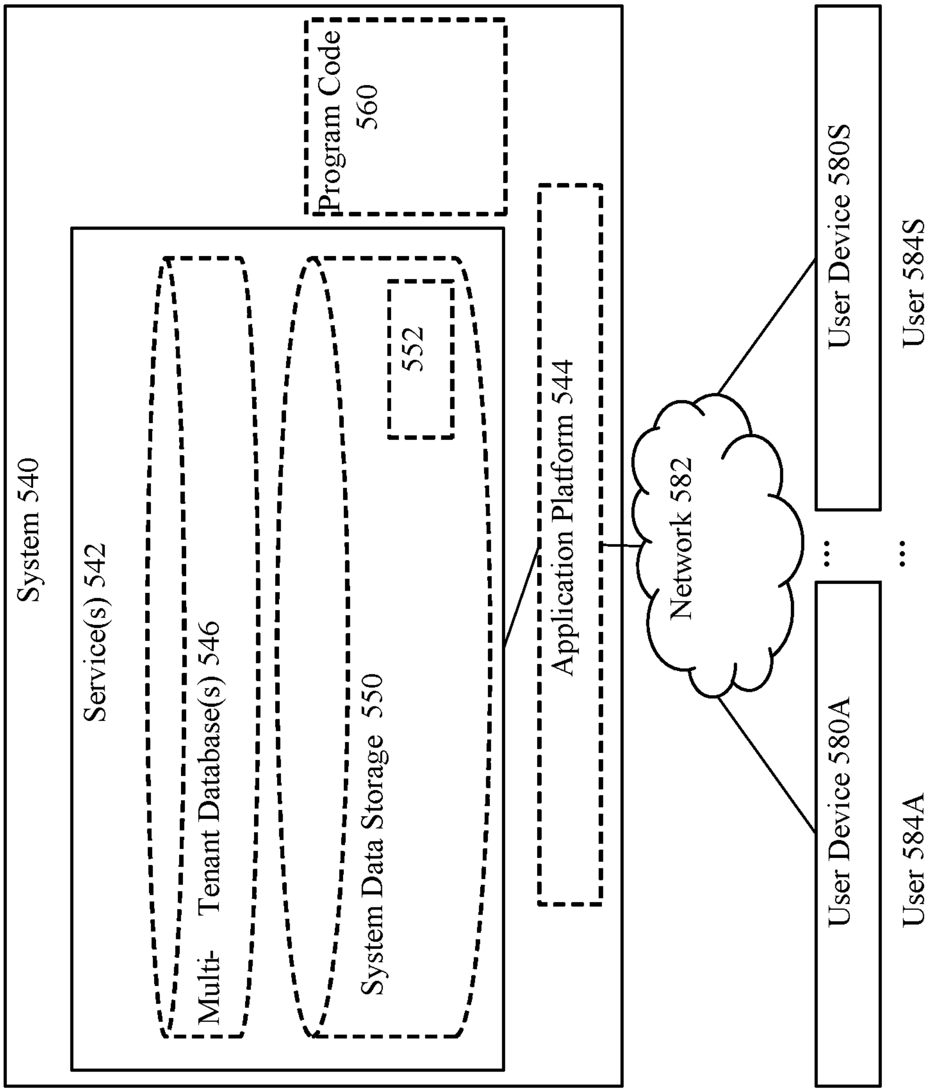
FIG. 5B is a block diagram of a deployment environment according to some exemplary implementations.

FIG. 5B is a block diagram of a deployment environment according to some example implementations. A system 540 includes hardware (e.g., a set of one or more server devices) and software to provide service(s) 542, including server-side services and/or client-side services. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter (s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the server-side services and/or client-side services, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP) or HTTP Secure (HTTPS), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:

dividing text data into a plurality of primary chunks based at least in part on one or more input criteria associated with a service, wherein the plurality of primary chunks are ordered in an ordered sequence in accordance with the text data;

generating a secondary chunk by merging a first subset of the text data comprising at least a last portion of a preceding primary chunk and a second subset of the text data comprising an initial portion of a following primary chunk of a respective pair of adjacent primary chunks in the ordered sequence, the secondary chunk comprising a subset of the text data overlapping at least the last portion of the preceding primary chunk and the initial portion of the following primary chunk;

when a semantic similarity between a conversational input to a user interface and respective the secondary chunk is greater than respective semantic similarities of respective primary chunks of the plurality of primary chunks, inputting the secondary chunk to the service, wherein the service generates response data based at least in part on the subset of the text data associated with the secondary chunk; and providing a response to the conversational input at the user interface based at least in part on the response data generated by the service.

2. The method of claim 1, further comprising:

determining a numerical representation of the conversational input to the user interface; and selecting the secondary chunk when a second numerical representation of the secondary chunk is closest to the numerical representation of the conversational input relative to respective numerical representations of the plurality of primary chunks.

3. The method of claim 2, further comprising removing personal identifying information from the conversational input prior to determining the numerical representation of the conversational input.

4. The method of claim 3, further comprising supplementing the response data with the personal identifying information removed from the conversational input to obtain the response prior to providing the response to the conversational input at the user interface.

5. The method of claim 1, wherein inputting the secondary chunk to the service comprises:

generating a grounded input prompt for the service based at least in part on the subset of the text data associated with the secondary chunk and the conversational user input, wherein the subset of the text data comprises the first subset of the text data of the last portion of the preceding primary chunk and the second subset of the text data of the initial portion of the following primary chunk of the respective pair of adjacent primary chunks of the plurality of primary chunks corresponding to the secondary chunk; and providing the grounded input prompt to the service, wherein the service generates the response data based on the grounded input prompt.

6. The method of claim 5, wherein:

the service comprises a large language model-based (LLM-based) service; and the response data comprises a conversational response responsive to the conversational input.

7. The method of claim 1, wherein generating the secondary chunk comprises merging the first subset of the text data of the preceding primary chunk and the second subset of the text data of the following primary chunk of the respective pair of adjacent primary chunks of the plurality of primary chunks corresponding to the secondary chunk using natural language processing (NLP) to delimit the secondary chunk.

8. The method of claim 1, wherein:

the service comprises a large language model-based (LLM-based) chatbot service;

inputting the secondary chunk to the service comprises providing a grounded input prompt to the LLM-based chatbot service comprising the subset of the text data associated with the secondary chunk and the conversational input;

the LLM-based chatbot service generates a conversational response to the conversational user input using the subset of the text data associated with the secondary chunk; and providing the response to the conversational input at the user interface comprises updating the user interface to provide a graphical representation of the conversational response responsive to the conversational input.

9. At least one non-transitory machine-readable storage medium that provides instructions that, when executed by at least one processor, are configurable to cause the at least one processor to perform operations comprising:

dividing text data into a plurality of primary chunks based at least in part on one or more input criteria associated with a service, wherein the plurality of primary chunks are ordered in an ordered sequence in accordance with the text data;

generating a secondary chunk by merging a first subset of the text data comprising at least a last portion of a preceding primary chunk and a second subset of the text data comprising an initial portion of a following primary chunk of a respective pair of adjacent primary chunks in the ordered sequence, the secondary chunk comprising a subset of the text data overlapping at least the last portion of the preceding primary chunk and the initial portion of the following primary chunk;

when a semantic similarity between a conversational input to a user interface and the secondary chunk is greater than respective semantic similarities of respective primary chunks of the plurality of primary chunks, inputting the secondary chunk to the service, wherein the service generates response data based at least in part on the subset of the text data associated with the secondary chunk; and providing a response to the conversational input at the user interface based at least in part on the response data generated by the service.

10. The at least one non-transitory machine-readable storage medium of claim 9, wherein the instructions are configurable to cause the at least one processor to:

determine a numerical representation of the conversational input to the user interface; and select the secondary chunk when a second numerical representation of the secondary chunk is closest to the numerical representation of the conversational input relative to respective numerical representations of the plurality of primary chunks.

11. The at least one non-transitory machine-readable storage medium of claim 10, wherein the instructions are configurable to cause the at least one processor to remove personal identifying information from the conversational input prior to determining the numerical representation of the conversational input.

12. The at least one non-transitory machine-readable storage medium of claim 11, wherein the instructions are configurable to cause the at least one processor to supplement the response data with the personal identifying information removed from the conversational input to obtain the response prior to providing the response to the conversational input at the user interface.

13. The at least one non-transitory machine-readable storage medium of claim 9, wherein the instructions are configurable to cause the at least one processor to:

generate a grounded input prompt for the service based at least in part on the subset of the text data associated with the secondary chunk and the conversational input, wherein the subset of the text data comprises the first subset of the text data of the last portion of the preceding primary chunk and the second subset of the text data of the initial portion of the following primary chunk of the respective pair of adjacent primary chunks of the plurality of primary chunks corresponding to the secondary chunk; and provide the grounded input prompt to the service, wherein the service generates the response data based on the grounded input prompt.

14. The at least one non-transitory machine-readable storage medium of claim 13, wherein:

the service comprises a large language model-based (LLM-based) service; and the response data comprises a conversational response responsive to the conversational input.

15. The at least one non-transitory machine-readable storage medium of claim 9, wherein the instructions are configurable to cause the at least one processor to merge the first subset of the text data of the last portion of the preceding primary chunk and the second subset of the text data of the initial portion of the following primary chunk of the respective pair of adjacent primary chunks of the plurality of primary chunks corresponding to the secondary chunk using natural language processing (NLP) to delimit the secondary chunk.

16. The at least one non-transitory machine-readable storage medium of claim 9, wherein:

the service comprises a large language model-based (LLM-based) chatbot service;

the instructions are configurable to cause the at least one processor to provide a grounded input prompt to the LLM-based chatbot service comprising the subset of the text data associated with the secondary chunk and the conversational input;

the LLM-based chatbot service generates a conversational response to the conversational input using the subset of the text data associated with the secondary chunk; and the instructions are configurable to cause the at least one processor to update the user interface to provide a graphical representation of the conversational response responsive to the conversational input.

17. A computing system comprising:

at least one non-transitory machine-readable storage medium that stores software; and at least one processor, coupled to the at least one non-transitory machine-readable storage medium, to execute the software that implements a large language model (LLM) grounding service and that is configurable to perform operations comprising:

dividing text data into a plurality of primary chunks based at least in part on one or more input criteria associated with a service, wherein the plurality of primary chunks are ordered in an ordered sequence in accordance with the text data;

generating a secondary chunk by merging a first subset of the text data comprising at least a last portion of a preceding primary chunk and a second subset of the text data comprising an initial portion of a following primary chunk of a respective pair of adjacent primary chunks in the ordered sequence, the secondary chunk comprising a subset of the text data overlapping at least the last portion of the preceding primary chunk and the initial portion of the following primary chunk;

inputting the secondary chunk to the service when a semantic similarity between a conversational input to a user interface and the secondary chunk is greater than respective semantic similarities of respective primary chunks of the plurality of primary chunks, wherein the service generates response data based at least in part on the subset of the text data associated with the secondary chunk; and providing a response to the conversational input at the user interface based at least in part on the response data generated by the service.

18. The computing system of claim 17, wherein the service comprises an LLM-based chatbot service and the LLM grounding service is configurable to generate a grounded input prompt for the LLM-based chatbot service based at least in part on the subset of the text data associated with the secondary chunk and the conversational input, wherein the response data comprises a conversational response to the grounded input prompt from the LLM-based chatbot service.

19. The method of claim 1, wherein:

the plurality of primary chunks are distinct and nonoverlapping;

the secondary chunk is distinct and nonoverlapping with respect to other boundary-coalescing secondary chunks corresponding to other pairs of adjacent primary chunks in the ordered sequence; and generating the secondary chunk comprises utilizing the one or more input criteria associated with the service to maintain the subset of the text data of the secondary chunk within size constraints associated with the service.

20. The method of claim 1, further comprising verifying the semantic similarity between the conversational input and the secondary chunk is greater than a grounding inclusion threshold prior to inputting the secondary chunk to the service.

* * * * *